Figure 33:
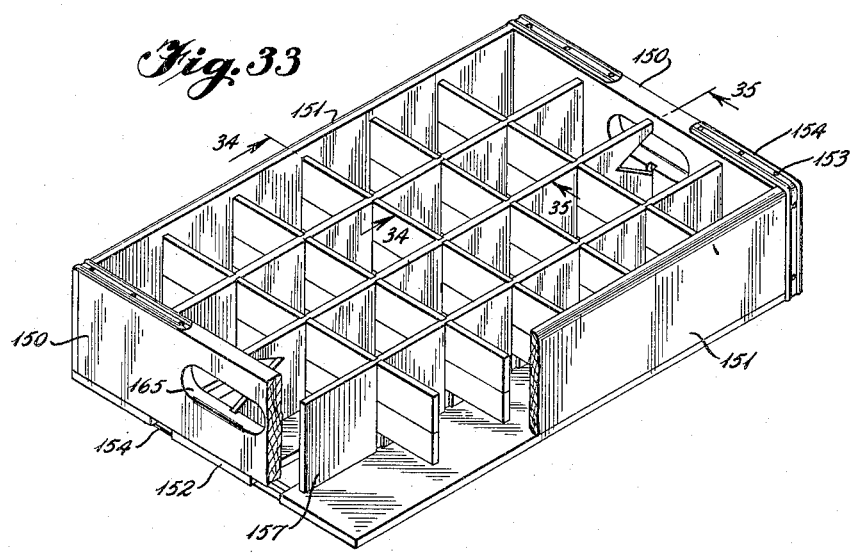

Sept. 25, 1962 W. C. DE BARDELABEN, JR 3,055,527
PARTITION UNIT
Filed April 29, 1959 6 Sheets-Sheet 1
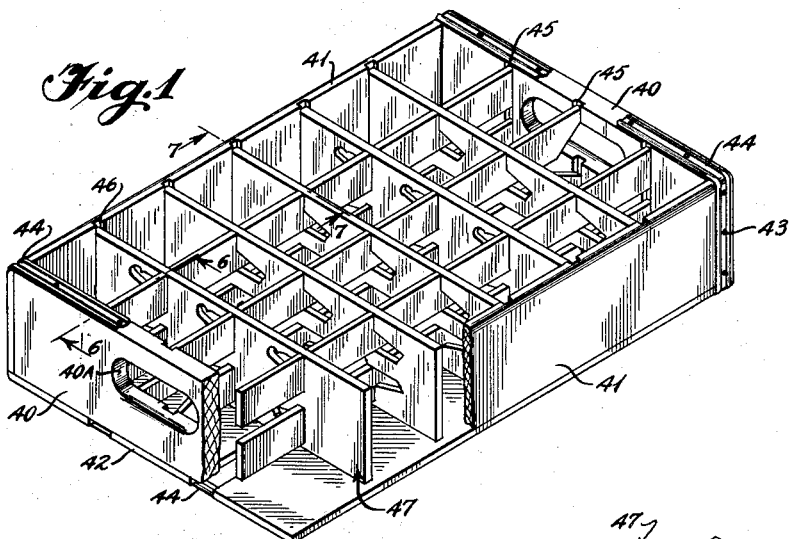
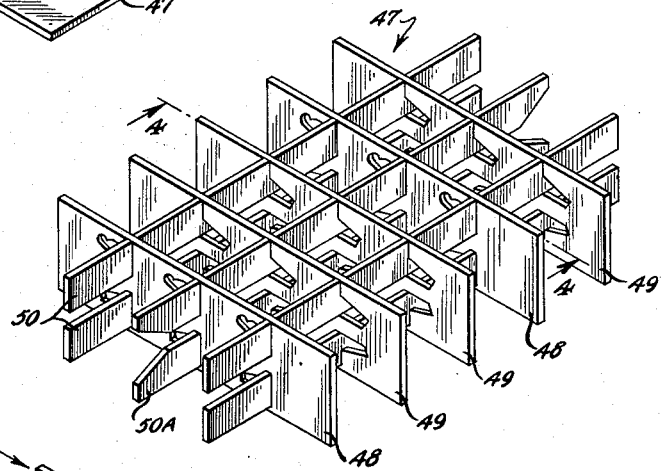
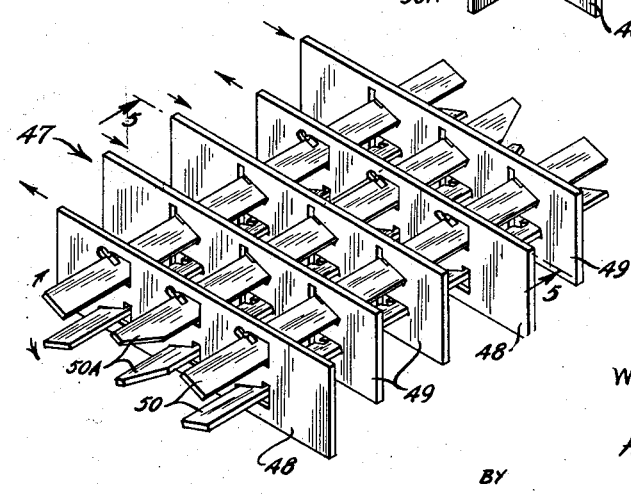
INVENTOR
W.C. DeBARDELABEN, JR
BY
ATTORNEY

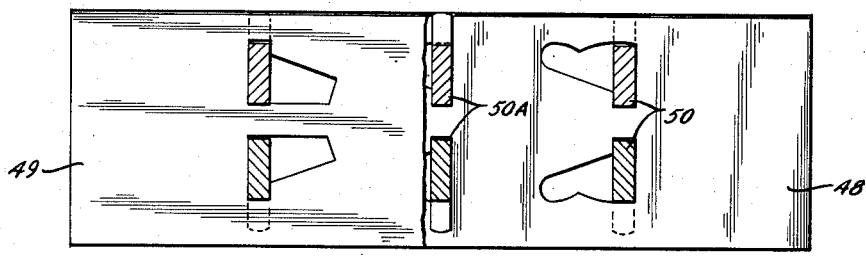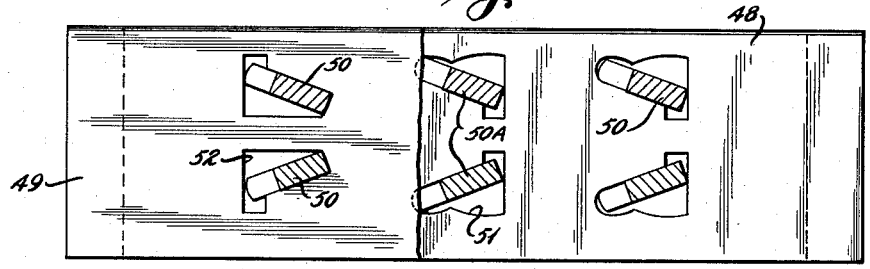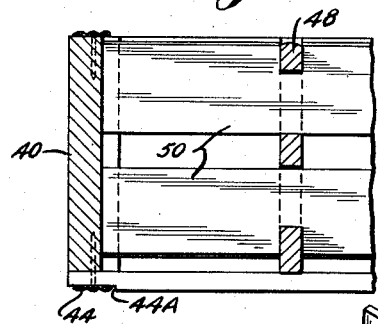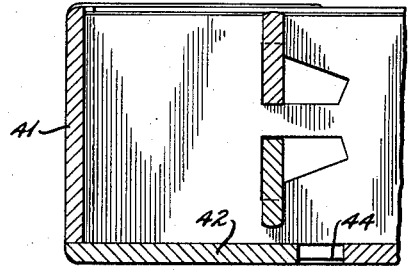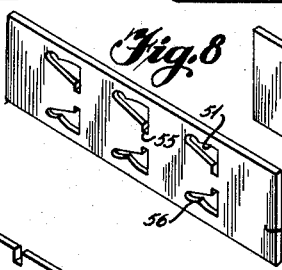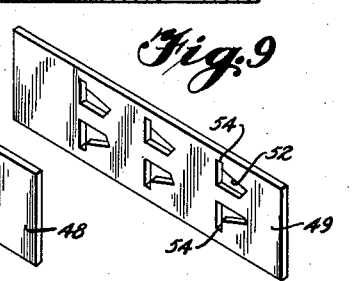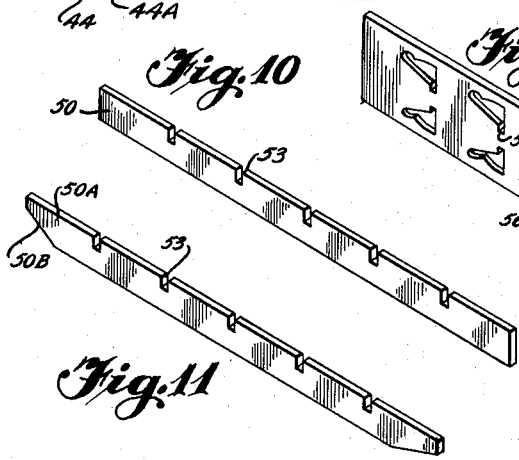

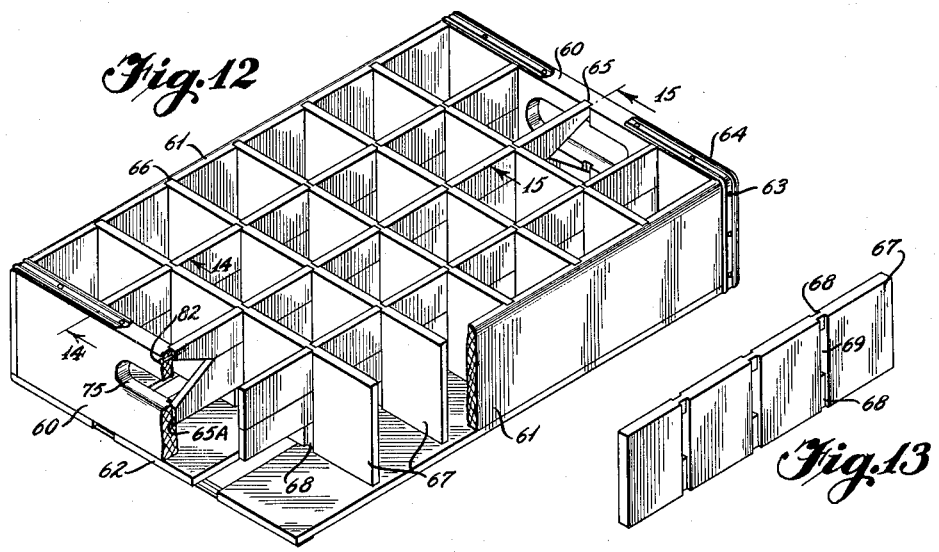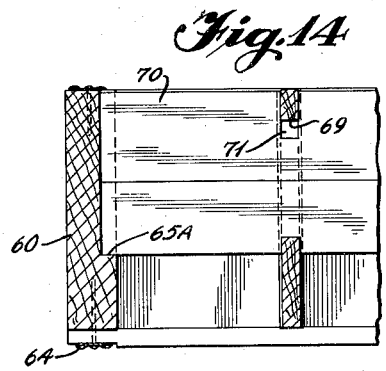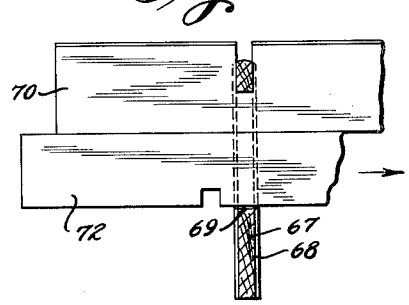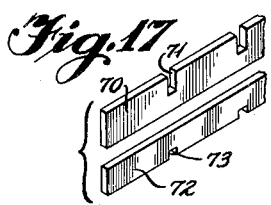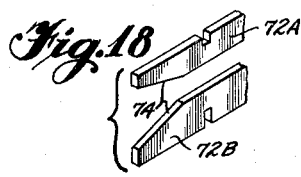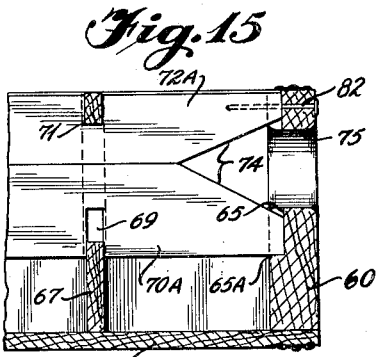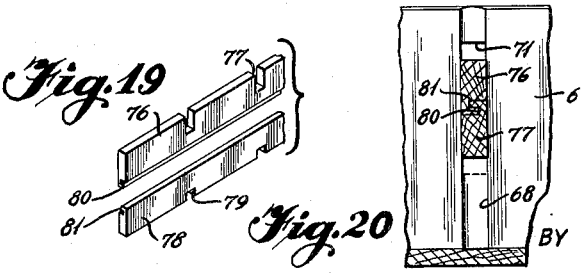

Sept. 25, 1962   W. C. DE BARDELABEN, JR   3,055,527
PARTITION UNIT
Filed April 29, 1959   6 Sheets-Sheet 4
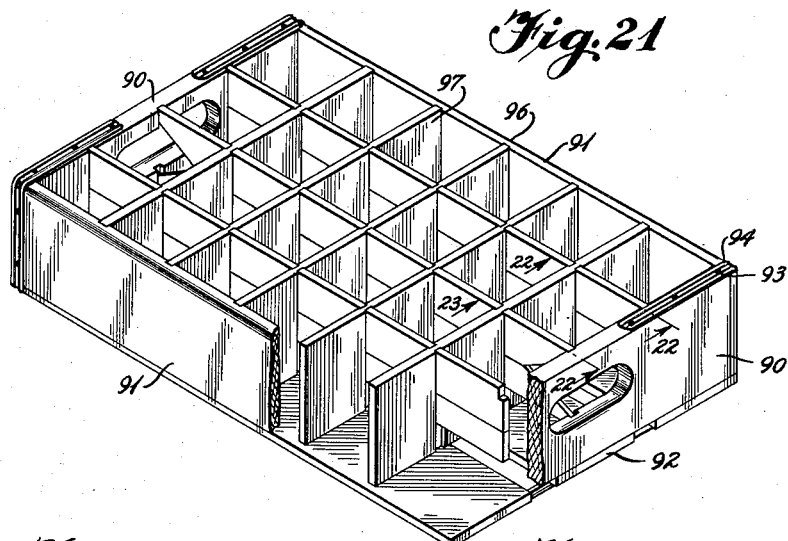
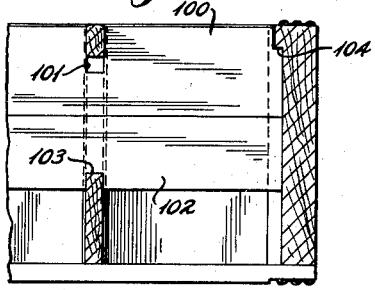
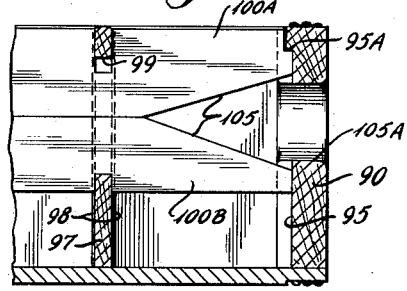
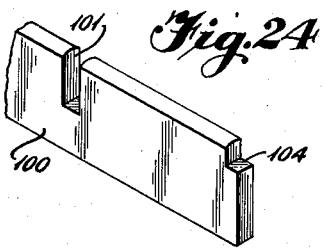
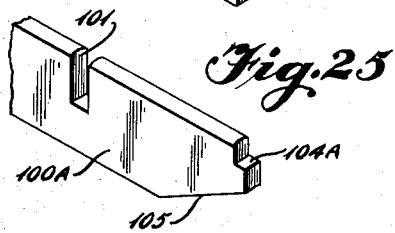
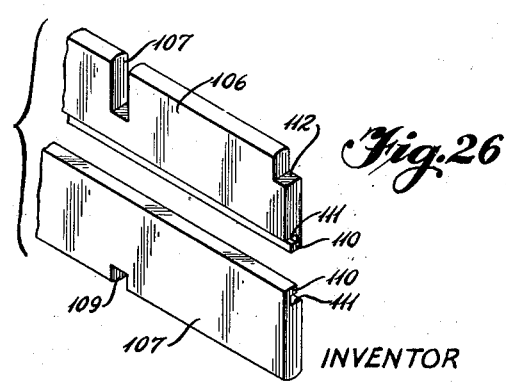
INVENTOR
W. C. DeBARDELABEN, JR.
BY A. Yater Dowell
ATTORNEY

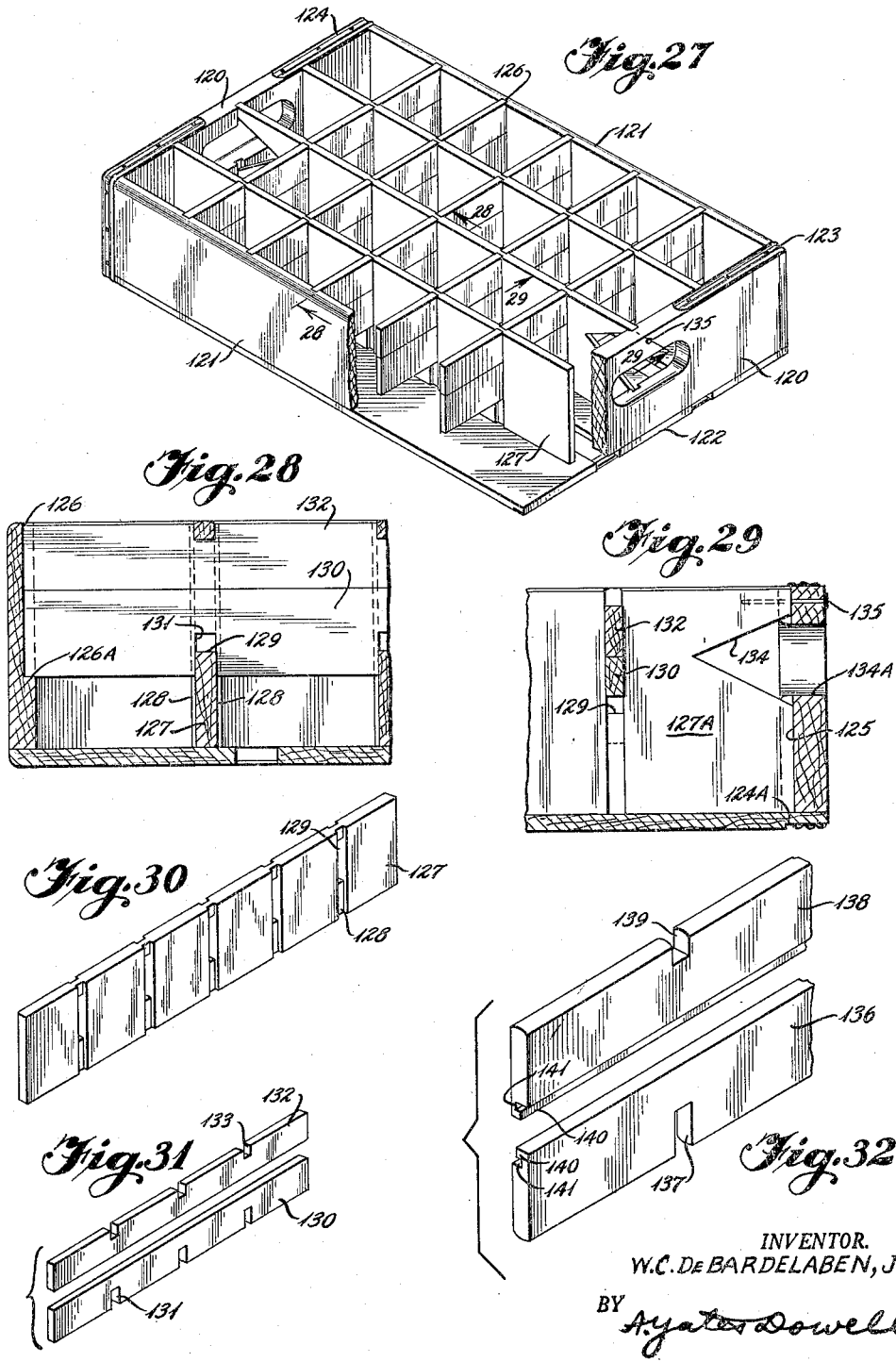

Sept. 25, 1962 W. C. DE BARDELABEN, JR 3,055,527
PARTITION UNIT
Filed April 29, 1959 6 Sheets-Sheet 6

INVENTOR.
W.C. DeBARDELABEN, JR
BY
A. Yates Dowell

United States Patent Office 3,055,527
Patented Sept. 25, 1962

3,055,527
PARTITION UNIT
William C. De Bardelaben, Jr., P.O. Box 26,
Wetumpka, Ala.
Filed Apr. 29, 1959, Ser. No. 809,886
5 Claims. (Cl. 217—22)

The present invention relates to containers and more particularly to crates and boxes having means to support individual items, particularly bottles, to prevent breakage of the bottles, simplify the handling thereof and provide long-lasting containers.

Heretofore, various types of containers have been used for obtaining separation of the individual items and boxes for bottle goods, such as soft drinks and the like have been provided in great numbers with high replacement cost because of breakage of the partitions and also due to lack of strength in the original structure. Consequently, the prior containers have not been entirely satisfactory.

An object of the present invention is to provide partitioned boxes of great strength which can be manufactured at low cost.

Another object is to provide partition units of general utility which can be applied to existing boxes as substitutes for the partition units which became broken in use.

A further object is to provide partitions formed of separable partition elements which may be assembled to provide a unitary partition.

Another object is to provide an inexpensive partition unit which can be manufactured with high speed machinery to obtain low cost containers for items such as bottles to be kept separated and to be kept from breakage.

Figure 34:
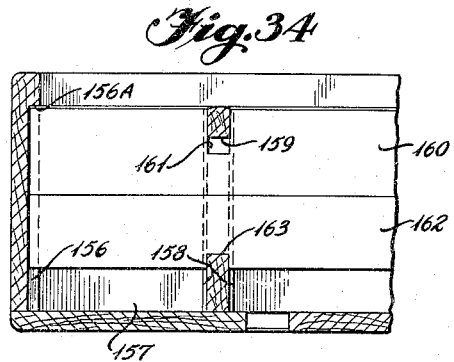
Figure 35:
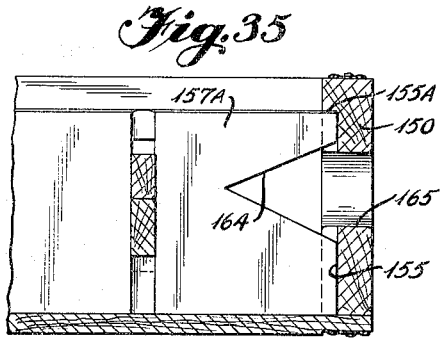
Figure 36:
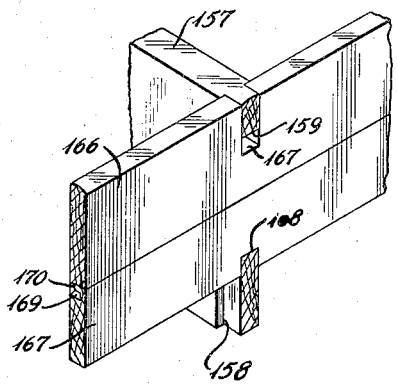

Other and further objects will be apparent as the description proceeds, and upon reference to the accompanying drawings, wherein:

FIG. 1 is an isometric view of a partitioned box with parts broken away, showing one form of partition unit in which the longitudinal partition elements pass through separate aligned openings in the transverse partitions with final assembly by pivotal movement of the longitudinal partition elements;

FIG. 2, an isometric view of the partition unit only of FIG. 1 in assembled relation ready for application to a box;

FIG. 3, an isometric view showing the rotation of the longitudinal partition elements in the final assembling of the partition unit of FIGS. 1 and 2;

FIG. 4, a broken section taken substantially on line 4—4 of FIG. 2 showing the position of adjacent partitions;

FIG. 5, a broke section taken substantially on line 5—5 showing the initial assembly of the longitudinal partition elements with the transverse partition elements immediately prior to pivotal movement of the longitudinal partition elements;

FIGS. 6 and 7, fragmentary sections taken substantially on lines 6—6, 7—7, respectively, of FIG. 1;

FIGS. 8 and 9 are isometric views of the two types of transverse partitions;

FIG. 10, an isometric view of one of the non-central longitudinal partition elements;

FIG. 11, an isometric view of one of the central partition elements;

FIG. 12, an isometric view of another modification of box and partition unit, with a single aperture in each transverse partition for each longitudinal partition;

FIG. 13, an isometric view of a transverse partition showing the slots and apertures for the longitudinal partitions;

FIG. 14, a section taken substantially on line 14—14 of FIG. 12;

FIG. 15, a section taken substantially on line 15—15 of FIG. 12;

FIG. 16, a fragmentary detail showing the assembly of the longitudinal partition elements;

FIG. 17, a fragmentary isometric view of the non-central upper and lower longitudinal partition elements;

FIG. 18, a fragmentary isometric view of the central longitudinal partition elements;

FIG. 19, a fragmentary perspective of another form of partition elements with laterally extending tongues and grooves on their adjacent edges;

FIG. 20, a fragmentary section taken through the partition elements of FIG. 19 in assembled relation at one of the transverse partitions;

FIG. 21, an isometric view, with parts broken away, of a further modification of box and partition unit in assembled relation;

FIGS. 22 and 23, sections taken substantially on lines 22—22 and 23—23, respectively of FIG. 21;

FIG. 24, an isometric view of the upper longitudinal non-central partitioned elements;

FIG. 25, a fragmentary isometric view of an end portion of the upper central partition element showing the finger receiving cut-away;

FIG. 26, a fragmentary isometric view of the end portion of modified partition elements usable with the box of FIG. 21;

FIG. 27, an isometric view, with parts broken away, of a still further modification of box and partition unit in assembled relation;

FIGS. 28 and 29, sections taken substantially on lines 28—28 and 29—29, respectively, of FIG. 27;

FIG. 30, an isometric view of a longitudinal partition element;

FIG. 31, a fragmentary isometric view of the upper and lower transverse partition elements;

FIG. 32, a fragmentary isometric view of the end portions of modified upper and lower transverse partition elements usable with the box of FIG. 27;

FIG. 33, an isometric view, with parts broken away, of a further modification of box and partition unit in assembled relation;

FIGS. 34 and 35, sections taken substantially on lines 34—34 and 35—35, respectively, of FIG. 33; and FIG. 36, an isometric view of a fragment of the partition unit with the modified transverse partition elements.

Briefly, the present invention in bottle containers comprises an open-top box having partition-receiving slots on the inner surfaces of the end and side walls with longitudinal and transverse interlocking partitions positively connected together with the ends of the partitions in the slots. One of the longitudinal or transverse partitions includes upper and lower partition elements which are received in apertures in the other of the longitudinal or transverse partitions in a manner providing positive interlock between the longitudinal and transverse partitions of the partition unit formed therefrom. The partition elements are provided with notches for receiving the adjacent edge portion of the apertured partition, thereby reinforcing the apertured partition.

Referring more particularly to the form of the invention shown in FIGS. 1 to 9, inclusive, an open-top box having ends 40, sides 41, and bottom boards 42 are held in assembled relation by means of nails 43 passing through metal straps 44 which extend across the bottom boards 42, side walls 41 and over the ends of the non-central longitudinal partitions and over the top edge of the end wall 40, thereby maintaining the box in positive assembled relation. Hand receiving holes 40A are provided in end walls 40 for ease of manipulation of the boxes.

The straps 44 are received in rabbets 44A in the ends of the bottom and side boards 42 and 41 to maintain a substantially flush relation in the finished box, the metallic strap 44 being provided with rounded bead edges to additionally provide a smooth exterior and adding strength to the structure.

The end walls are provided with slots 45 and the side walls, with slots 46 extending from the bottom edge to the top edge for receiving longitudinal and transverse partitions, respectively, of a partition unit 47.

The partition unit 47 includes two substantially identical transverse partitions 48 and three different substantially identical transverse partitions 49, as shown in FIGS. 8 and 9, respectively. Each longitudinal partition is formed of substantially identical partition elements 50, the central partition being formed of partition elements 50A which have oblique ends 50B to provide for accommodating the fingers of a person passing through the hand-holes 40A in the end walls 40.

Referring more particularly to FIG. 8, it will be noted that the transverse partition 48 is provided with six substantially identical L-shaped apertures 51. The free ends of the base legs of the L-shaped openings 51 extend toward each other end the stems of the L-shaped openings 51 extend in the same general direction shown to the left in the drawings.

The transverse partitions 49 are provided with L-shaped apertures 52 having their base legs extending away from each other and their stems extending to the right as shown in the drawing.

The longitudinal partition elements 50 or 50A are provided with notches 53 for cooperation with the edge portions of the transverse partitions 48 and 49, and such notches 53 provide a center lap-type of joint with the notch formed in the free end 54 of the L-shaped aperture 52 of the transverse partition 49, thereby providing a positive-interlock between longitudinal partition elements 50 or 50A and transverse partitions 49 in the final assembled position. Each aperture 51 in transverse partition 48 has a notch 55 at the free end of the base and an indentation 56 on the stem portion.

In assembling the partition unit 47, the two transverse partitions 48 and the three transverse partitions 49 are preferably arranged with transverse partitions 49 at the ends and the middle and transverse partitions 48 between the adjacent partitions 49, but in the drawings two transverse partitions 49 are shown adjacent each other to show a modified manner of assembling the partition unit and obtaining many of the advantages thereof.

When partitions 48 and 49 are arranged in staggered relation as shown in FIGS. 3 and 5 the apertures 51 and 52 in partitions 48 and 49 provide a passage through which the partition elements 50 and 50A may be inserted as shown in FIGS. 3 and 5, and after assembly with the transverse partitions in registry with notches 53 the longitudinal partition elements 50 and 50A are rotataed as shown by the arrows in FIG. 3 to the position shown in FIGS. 2 and 4 causing the transverse partition to take the position shown in FIGS. 2 and 4, thereby completing the partition unit 47. The box may be completed except for the fastening of the strap 44 on the top edges of the end walls 40, and the partition unit is slid from the top into the box with the ends of the longitudinal and transverse partitions located in the slots 45 and 46, respectively, and thereafter the ends of straps 44 are nailed down, whereby the straps being of a width of the order of the thickness of the end walls 40 overlap the ends of the longitudinal partition elements 50, thereby retaining the partition unit in the box.

The slots 45 in the end walls prevent rotation of partition elements 50 and 50A, thereby maintaining the partition unit in assembled relation, and the snug fit of the longitudinal partition elements as shown in FIGS. 4, 6 and 7 shows how the parts are maintained in fixed relation to each other and to the box.

Referring to the modification shown in FIGS. 12 to 20, inclusive, an open-top box having end walls 60, side walls 61 and bottom wall 62 is held in assembled relation by nails passing through metallic beaded straps 64, passing around the bottom and sides and a portion of the top edge of each end wall to maintain the side and bottom walls in operative position. The end walls 60 are provided with slots 5 for receiving the ends of longitudinal partitions, the slots extend from the top of the box to adjacent the bottom, but terminate short of the bottom to provide stops 65A to limit the downward movement of the longitudinal partitions. The side walls 60 are provided with slots 66 which extend from the top edge to the bottom edge for receiving transverse partitions 67 which may engage the bottom 62 and extend to substantially flush relation with the top edges of the side and end walls.

The partition unit is formed by a plurality of transverse partitions 67 having slots 68 extending from the bottom edge to the top edge and having apertures 69 registering with slots 68 as clearly shown in FIGS. 13 to 16. The slots and apertures 68 and 69 in the transverse partitions are arranged in registry with the slots 65 in the end walls and are adapted to receive the longitudinal partitions which include a wide partition element 70 having deep notches 71 at its outer edge and a narrow partition element 72 having shallow notches 73 at its outer edge, whereby the beam strengths of the narrow and wide partition elements 70 and 72 are substantially equal. The longitudinal partition elements cooperate with the transverse partitions 67 by insertion of the wide partition element into apertures 69 with the deep notches in registry with the transverse partitions and after insertion the wide non-central partition elements are moved upwardly so that the bottoms of the notches 71 engage the top of the aperture 69, thereby providing sufficient clearance between the unnotched edge of the wide partition element 70 and the lower end of the aperture 69 to receive the narrow partition element 72, as clearly shown in FIG. 16, and after the partition elements are in position the longitudinal partitions, including elements 70 and 72 are moved downwardly to the position shown in FIG. 14, thereby maintaining the non-central longitudinal partitions in fixed position with respect to the transverse partitions.

The central partition includes a wide partition element 70A at the bottom and a narrow partition element 72A, and such elements are provided with oblique ends 74 to provide for the reception of the fingers of a person handling the box through the hand-receiving openings 75.

The assembly of the central partition is substantially similar to that of the non-central partition elements, but the engagement of the shallow notch 71 with the upper end of the aperture 69 prevents the central partition from moving upwardly and, therefore, the strap 64 which engages the upper edge end portion of the wide non-central partition element 70 serves to maintain the partition unit in fixed relation to the box. The central partition is prevented from movement toward the bottom 42 by the stop 65A at the bottom of the groove 65.

A modified form of longitudinal partition is shown in FIGS. 19 and 20 and includes a first partition element 76 having deep notches 77 and a second partition element 78 having shallow notches 79 at one edge. The other edges are provided with cooperating tongues and grooves 80 and 81, respectively, which extend transversely to the plane of the partition element and are so dimensioned as to interlock the deep notch partition element with the shallow notch partition element, as clearly shown in FIG. 20.

In assembling the partition elements 76 and 78 the wide notch partition element is inserted first, in a manner similar to that shown in FIG. 16, and the shallow notch partition element is slidably inserted with the tongue and groove of the partition elements in engagement, and after complete insertion the partition formed from partition elements 76 and 78 is moved in the direction of the shallow notches and the assembly is completed as shown in FIG. 20 in substantially the manner above described. The central partition would be provided with the oblique cut-away end portion 74 and the wide notch partition element would extend downwardly to provide for effective retention of the partition unit by the straps 64. If desired, an additional nail 82 can be used to maintain the central partition in place.

In the above described modification, the partition unit, after asesmbly, is inserted through the open top of the box and is retained by straps 64.

It will be noted that the above described partition units are dimensioned so that the transverse partitions engage the bottom of the box.

Referring more particularly to the modifications shown in FIGS. 21 to 26, the bottle-receiving box comprises end walls 90, side walls 91 and bottom wall 92, which are held in assembled relation by the usual nails 73 extending through the usual metallic straps 94 in the manner previously described.

The end walls are provided with slots 95 extending from the bottom edge to adjacent the top and terminating in a stop 95A, while the side walls are provided with slots 96 which extend from the bottom 92 to the top edge of the box and receive transverse partitions which have slots 98 on each surface thereof in registry with slots 95 in the end wall, and such transverse partitions 97 also are provided with apertures 99 through which longitudinal partition elements may be inserted. Each longitudinal partition element includes a wide partition element 100 having deep notches 101 and a narrow partition element 102 having shallow notches 103, and such partition elements are assembled in substantially the manner previously described, but the top wide partition element 100 is provided with an angle cut-out 104 which engages the stop 95A at the upper end of the slot 95, thereby providing a flush relation between the upper edge of the partition element 100 and the upper edges of the end and side walls 90 and 91.

The central partition is formed of partition elements 100A and 100B, which have cut-away diagonal end portions 105 registering with hand-hole receiving apertures 105A in the end walls and a stop receiving notch 104A is provided at the end of the central partition to maintain the flush relationship of the top of the partitions with the end walls.

In this modification the assembled partition unit will be inserted from the bottom before the bottom wall 92 is attached to the end and side walls, thereby preventing removal of the partition unit.

The longitudinal partition may be formed of modified partition elements, including a partition element 106 having deep notches 107 and a partition element 108 having shallow notches 109, and such partition elements are provided with tongues and grooves 110, 111, extending laterally from the unnotched edge to provide for positive assembly thereof, and it will be evident that the deep notch partition element is inserted first into aligned apertures 99 of the several transverse partitions 97 and the deep notches 107 bottomed against the adjacent edge portion of the transverse partition and thereafter the shallow notch partition element 108 is slidably assembled with the deep notch partition element 106 with tongues and grooves 110 and 111 interengaging within the apertures 99 in the transverse partitions, after which the entire longitudinal partition is moved in the direction of the shallow notches to maintain the assembled relation. The partition element 106 is provided with a notch 112 to receive the stop 95A of the end wall 90.

Upon reference to FIGS. 27 to 32, inclusive, a modified form of the invention is applied to a box having end walls 120, side walls 121 and bottom wall 122, with the walls maintained in assembled relation by suitable nails or the like 123 passing through straps 124 having bead portions on the edges thereof, the straps being positioned in recesses 124A in the bottom and end walls to maintain a substantially flush relation. The end walls are provided with grooves 125 extending from the bottom to the top edge, and the side walls are provided with grooves 126 extending from the top edge toward the bottom edge and terminating in stop 126A against which the transverse partitions abut to prevent such transverse partitions from moving downwardly.

In this modification the longitudinal partitions are provided with transverse grooves or slots 128 extending from one edge to the other at each surface thereof and an aperture 129 registering with such slot adapted to receive a transverse partition formed of a first partition element 130 having deep notches 131 and a second partition element 132 having shallow notches 133, and such partition elements are assembled in the manner previously described to provide a partition unit. The center longitudinal partition 27A is provided with a finger-receiving recess 134 for registry with a hand-hole receiving aperture 134A in the end wall 125.

In assembling the partition unit in this modification the straps 124 are left unattached at the upper edge of the end wall and the partition unit inserted with each wide partition element 130 engaging the stop 126A of the associated groove 26 in the side wall. The central partition 127A is maintained in position by nails 135 to prevent movement of such central partition 127A upwardly, the non-central partitions being maintained in position by the strap 124 held by the nails 123.

A further modification includes a first transverse partition element 136 having deep notches 137 and a second partition element 138 having shallow notches 139, with the partition elements 138 and 136 being provided with tongues and grooves 140, 141 extending laterally from the unnotched edges and adapted to interfit providing for the sliding assembly previously described. The shallow notches 139 will engage the upper ends of apertures 129 to prevent upward movement of the transverse partition element, while the wide notches permit the downward movement of partition element 136 to provide for the insertion of the second partition element, and thereafter the entire partition may be moved to its final position. After assembly of all partitions in the final partition unit, such unit is inserted into the box from the open top thereof, being held by straps 124 and nails 123, 135.

Referring to the modification shown in FIGS. 33 to 36, inclusive, a box having end walls 150, side walls 151, and bottom 152 is held in assembled relation by nails 153 passing through metal strips 154 having beaded edges, with the strap received in a rabbet in the ends of the bottom and side walls. The end wall is provided with grooves 155 for receiving the longitudinal partitions while the side walls are provided with grooves 156 for receiving the transverse partitions, and such grooves terminate in stops 155A and 156B, respectively, at their upper ends. The longitudinal partitions 157 are provided with grooves 158 for registry with grooves 155 in the end walls. The longitudinal partitions have apertures 159 registering with such grooves 158 for receiving the transverse partitions, including a first transverse partition element 160 having deep notches 161 and a second transverse partition element 162 having shallow notches 163, similar to partition elements previously described, it being apparent that in assembly each transverse partition element 160 with deep notches is first inserted through the apertures 159 in the longitudinal partitions and moved laterally to provide space for the insertion of each cooperating partition element 162 with shallow notches, and after insertion of both elements the entire transverse partition is moved laterally so that the bottom of each shallow notch 163 engages the bottom of the cooperating aperture 159, thereby determining the position of the partitions and providing a partition unit for application directly to the box.

The central longitudinal partition 157A is provided with a hand-receiving cut-out 164 registering with a hand-receiving hole 165 in the end wall 150. It will be evident that the partition unit is inserted through the bottom into the box before the bottom 152 is applied to the box and the upper edges of the partition engage the stops 155A and 156A, while the bottoms of the apertures 159 engage the bottoms of the notches 163, thereby preventing relative movement and maintaining the parts in assembled relation, the longitudinal partitions contacting the bottom of the box to maintain this relationship.

A modified form of the transverse partition may be provided as shown in FIG. 36, in which a longitudinal partition 157 receives a first transverse partition element 166 having deep notches 167 in one edge thereof and a second partition element having shallow notches 168 in one edge thereof, while the other edge of each transverse partition element is provided with a tongue 169 and a groove 170 which interfit in the manner previously described to provide for assembly, and the parts thereof when assembled in a partition unit are inserted into the box from the bottom as previously described.

The box and partitions are preferably made of wood and the interengagement of the partition elements with the slots or grooves in the partitions having apertures serves to reinforce the partition unit against diagonal forces and also the interfitting of the material of the notched partition elements in the grooves or slots of the apertured partitions serve to prevent breakage of the portion of the partition elements between the notches.

From the above description it will be apparent that a new and useful bottle-receiving box and partition unit is provided in the structure described.

It will be apparent that various changes may be made within the spirit and scope of the invention as above described and as defined by the claims.

What is claimed is:

1. A partition unit for use in a box comprising a plurality of partitions, each partition having a plurality of L-shaped apertures therethrough with the stems of the L-shaped apertures parallel with the edges of the partitions and with the bases of corresponding apertures in the partitions in registry, the walls of each aperture defining the terminal portions of the bases being generally parallel, a plurality of partition elements received in registering L-shaped apertures, each partition element having notches in one edge thereof in interlocked relation with said terminal portions of the bases of the L-shaped apertures, the said stems of the L-shaped apertures flaring toward said bases to permit rotation of the partition elements from substantially parallel to the stems to substantially parallel to the bases of the L-shaped apertures, each of said partition elements being of a width substantially the length of the stem portion of the L-shaped apertures, the walls of each aperture defining the base terminal portion being spaced apart substantially the thickness of the cooperating partition elements at the cooperating notch, the walls of the L-shaped apertures defining the stems at the connections between the stems and bases being free of notches, the depth of the notches being such that the distance from the bottom of each notch to the other edge of the partition element is substantially equal to the base of the L-shaped aperture whereby a secure assembled condition is maintained by the partition and the partition elements so that by preventing rotation of partition elements the partition unit is maintained in assembled relation.

2. The invention according to claim 1 in which each partition has two rows of L-shaped apertures with the stems of the L-shaped apertures in alternate partitions extending in opposite directions whereby alternate partitions move in opposite directions upon rotation of the partition elements in assembling the partition unit.

3. The invention according to claim 1 in which alternate partitions have the stems of the apertures extending in opposite directions.

4. The invention according to claim 1 in which each partition has two rows of L-shaped apertures.

5. A strong partitioned box unit comprising a box having a bottom wall, side walls and end walls, the inner surfaces of the side and end walls having grooves receiving partitions and partition elements of a partition unit, said partition unit including a plurality of partitions, each partition having a plurality of L-shaped apertures therethrough with the stems of the L-shaped apertures parallel with the edges of the partitions and with the bases of corresponding apertures in the partitions in registry, the walls of each aperture defining the terminal portions of the bases being generally parallel, a plurality of partition elements received in registering L-shaped apertures, each partition element having notches in one edge thereof in interlocked relation to said terminal portions of the bases of the L-shaped apertures, the said stems of the L-shaped apertures flaring toward said bases to permit rotation of the partition elements from substantially parallel to the stems to substantially parallel to the bases of the L-shaped apertures, each of said partition elements being of a width substantially the length of the stem portion of the L-shaped apertures, the walls of each aperture defining the base terminal portion being spaced apart substantially the thickness of the cooperating partition elements at the cooperating notch, the walls of the L-shaped apertures defining the stems at the connections between the stems and bases being free of notches, the depth of the notches being such that the distance from the bottom of each notch to the other edge of the partition element is substantially equal to the base of the L-shaped aperture whereby a secure assembled condition is maintained by the partition and the partition elements so that by preventing rotation of partition elements the partition unit is maintained in assembled relation.

References Cited in the file of this patent

UNITED STATES PATENTS

| | | |
|---|---|---|
| 189,230 | Kappe | Apr. 3, 1877 |
| 221,589 | Merlette | Nov. 11, 1879 |
| 537,043 | Kimball | Apr. 9, 1895 |
| 618,698 | Loeffel | Jan. 31, 1899 |
| 1,027,358 | Schoeppl | May 21, 1912 |
| 1,167,620 | Blackwell | Jan. 11, 1916 |
| 1,253,442 | Tozer | Jan. 15, 1918 |
| 2,334,198 | Hutchings | Nov. 16, 1943 |
| 2,554,958 | Rosenberg et al. | May 29, 1951 |

OTHER REFERENCES

| | | |
|---|---|---|
| 158,682 | Switzerland | Feb. 1, 1933 |